United States Patent
Cluwen

[15] 3,654,575
[45] Apr. 4, 1972

[54] WAVE TRANSMISSION TIME DEVICE

[72] Inventor: Johannes Meyer Cluwen, Emmasingel, Eindhoven, Netherlands

[73] Assignee: U.S. Philips Corporation, New York, N.Y.

[22] Filed: Dec. 2, 1969

[21] Appl. No.: 881,461

[30] Foreign Application Priority Data

Dec. 6, 1968 Netherlands..........................6817492

[52] U.S. Cl..................................................333/30, 333/71
[51] Int. Cl.........................................H03b 7/30, H03b 9/30
[58] Field of Search........................................333/30, 29, 71

[56] References Cited

UNITED STATES PATENTS

| | | | |
|---|---|---|---|
| 2,826,745 | 3/1958 | Page | 333/30 |
| 2,839,731 | 6/1958 | McSkimin | 333/30 |
| 3,475,704 | 10/1969 | Vander Burgt | 333/30 |
| 2,965,851 | 12/1960 | May | 333/30 |

*Primary Examiner*—Herman Karl Saalbach
*Assistant Examiner*—C. Baraff
*Attorney*—Frank R. Trifari

[57] ABSTRACT

A wave transmission time device, for example an ultrasonic delay line, having a triangular delay body in order to avoid angular tolerances.

10 Claims, 1 Drawing Figure

PATENTED APR 4 1972     3,654,575
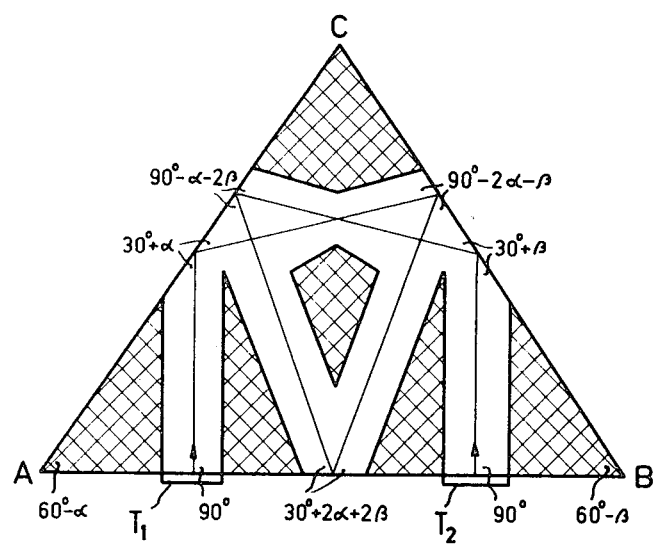
INVENTOR.
JOHANNES MEYER CLUWEN
BY
AGENT

WAVE TRANSMISSION TIME DEVICE

The present invention relates to a wave transmission time delay device in which a wave enters at one of the boundary surfaces of a body, is reflected from other boundary surfaces of this body and ultimately emerges from the body again at one of the boundary surfaces. One of the uses of such wave transmission time devices is an ultrasonic delay line in which, by means of an input transducer, electrical oscillations are converted into ultrasonic mechanical vibrations which propagate through the body and after several reflections ultimately impinge on an output transducer, in which they are converted back into electrical oscillations. Owing to the transmission time of the ultrasonic waves through the body a certain delay time between the electrical input and output signals is created, which is utilized in colour television and computer circuits.

Another use of the said wave transmission time devices lies in the sector of modulation of light or other electromagnetic waves. In this use, the light or the wave passes through a body having a modulatable index of refraction, for example, a potassium dihydrogen phosphate or another birefringent single crystal the refractive index of which depends upon the strength of the applied electric field. As a result, the transmission time is modulated so that the emergent light or the emergent wave is phase modulated and/or amplitude modulated.

A problem in such wave transmission time devices is the accurate maintenance of the angles at which the wave is incident on the various reflection surfaces.

It is an object of the present invention to provide simple means by which these angle tolerances are made less troublesome. The invention is characterized in that the surfaces of the body which reflect the wave form a triangular prism in which the angles at the base have values between 45° and 60°, the wave entering at the lateral face which, in a cross-section of the prism, forms the base of the triangle, the wave then being reflected successively at the two lateral faces which in a cross-section of the prism form the other sides of the triangle and subsequently being reflected from the base face, then again in the same order from the other two lateral faces, and ultimately emerging from the base face.

The invention will now be described more fully with reference to the drawing which shows, by way of example, an embodiment of a device according to the invention.

The single Figure of the drawing is a cross-sectional view of a triangular prismatic body taken in a plane at right angles to the lateral faces and having vertices A, B and C, transducers $T_1$ and $T_2$ being applied to the lateral face which in the cross-section forms the base of the triangle. The transducers convert electrical oscillations into mechanical vibrations and vice versa. The ultrasonic wave emitted from the transducer $T_1$ will propagate through the body along a path shown by a solid line. A certain concentration of the wave into a beam is obtainable in that the degree of polarisation of the transducers is made to be highest at their centres and to fall off gradually towards the left-hand edge and the right-hand edge and/or in that the transducers are shaped so as to be concave, i.e. they are shaped so that their thickness is smallest at the centre and slightly increases towards the edges. The direction of polarisation preferably is chosen parallel to the direction AB and the thickness of the body at right angles to the plane of the drawing is preferably smaller than five times the wavelength of the ultrasonic mechanical wave in the body. Such a body may, for example, be made from a much thicker prism, the lateral faces AB, BC and CA of which have previously been ground and on which transducers have been provided throughout its height (i.e. at right angles to the plane of the drawing), the transducers have previously been polarised in a direction parallel to AB, after which this prismatic body is cut into thin slices in a direction at right angles to this direction of height, i.e. parallel to the plane of the drawing, so that the body shown in the Figure is obtained. The cross-hatched part of the body may be coated with damping material in order to ensure that the ultrasonic wave only travels along the (non-hatched) paths shown. Instead of coating the surface with a damping material, it may be locally roughened, for example, by etching, so that at the roughened areas the waves are scattered. Alternatively, the hatched parts may have been coated with a material, for example, a metal, such as to produce acoustic mismatching for the ultrasonic waves, with the result that the ultrasonic wave substantially can not pass through these hatched regions.

to the invention the angles at the base A and B have been chosen to be between 45° and 60° and the transducers $T_1$ and $T_2$ have been provided so as to produce wave propagation along the paths shown. Thus, waves emitted from the transducer $T_1$ will first be reflected from the face AC, then from the face CB, then from the base AB, then again from the first mentioned face AC and then again from the face CB, after which they impinge on the output transducer $T_2$ provided on the base AB. From the values for the various angles shown in the drawing it can be deduced that, if the wave is emitted from the input transducer $T_1$ in a direction at right angles thereto, it also will impinge on the output transducer $T_2$ in a direction at right angles thereto. As a result slight inaccuracies of the angles $\alpha$ and $\beta$ do not affect the direction of the waves incident on the transducer $T_2$ and hence do not affect the transmission time of the waves measured between the transducers $T_1$ and $T_2$. When the angles at the base A and B are not chosen within the given values, the wave path shown will not be obtainable. Preferably the angles A and B will be between 46° and 50°, for example, 48°, in order to take maximum advantage of the total reflection from the various reflecting faces. In this case the transducers $T_1$ and $T_2$ must be provided closer together and at least the hatched portions adjacent the angles A and B can be omitted. The resulting delay line is extremely compact and provides a long delay time, for example, a delay time of about 64 $\mu$s commonly used in television receivers, in a small volume.

From the above it will be clear that the geometry described may be used in the same manner for the light-modulation devices mentioned hereinbefore. The body ABC then is made from a material the refractive index of which can be modulated, for example, by means of an applied electric field strength, so that the light beam incident at $T_1$ (in this case the transducers $T_1$ and $T_2$ will obviously have been omitted) again travels along the path shown and emerges normally at $T_2$. Even if the incident light beam should impinge on the face AB at an angle different from a right angle, the emergent light beam will be perfectly parallel to this incident light beam, which property is of high advantage when the device is used in conjunction with lasers.

It should be noted that the transducers $T_1$ and $T_2$ need not necessarily be provided on the face AB from the central portion of which the wave is reflected, but that these transducers may also be arranged on a surface parallel to the face AB. It may be of particular advantage for the body to have a part removed by grinding in a direction parallel to itself at the location of the above mentioned reflection, so that direct coupling of stray radiation from the transducer $T_1$ to the transducer $T_2$ is avoided.

The body need not necessarily be made of a solid material, for example, glass, but it may alternatively be a liquid, the walls of the vessel containing this liquid having a cross section similar to the triangle ABC.

What is claimed is:

1. A wave transmission time device in which a wave enters a wave transmission body at one of its boundary surfaces, then is reflected from other boundary surfaces of this body and ultimately emerges from the body at one of the boundary surfaces, characterized in that the faces of the body which reflect the wave form a triangular prism in a cross-section of which the angles at the base of the triangle are between 45° and 60°, with at least one base angle greater than 45°, means directing the wave so that it enters the body perpendicularly at the face which in the said triangle forms the base and at an angle such that the wave is reflected successively from the two other lateral faces and subsequently from the first mentioned base face, then again in the same order from the two other lateral faces and ultimately emerging at the said base face whereby said emerging wave is parallel to the entering wave and substantially normal to said base.

2. A wave transmission ultrasonic delay line device in which a wave enters a wave transmission body composed of ultrasonic wave transmitting material at one of its boundary surfaces, then is reflected from other boundary surfaces of this body and ultimately emerges from the body at one of the boundary surfaces, characterized in that the faces of body which reflect the wave form a triangular prism in a cross-section of which the angles at the base of the triangle are between 45° and 60°, means directing the wave so that it enters the body at the face which in the said triangle forms the base and at an angle such that the wave is reflected successively from the two other lateral faces and subsequently from the first mentioned base face, then again in the same order from the two other lateral faces and ultimately emerging at the said base face, the device further comprising a pair of transducers for converting electrical oscillations into mechanical vibrations and vice versa provided on, or parallel to, the base face of the prism.

3. A device as claimed in claim 2, characterized in that the angles at the base are limited to the range of values between 46° and 50°, the unnecessary portions of the body adjacent these angles being omitted.

4. A wave transmission delay device comprising a triangular prism body of wave transmitting material in which the wave reflecting surfaces of the body form said triangular prism in which the angles at the base are limited to a range of values between 45° and 60°, means for directing an input wave so that it enters the body perpendicularily at a point on the surface which, in a cross section of the prism forms the base of the triangle, and at an angle such that the wave is reflected in sequence from the two lateral surfaces which, in a cross section of the prism, form the other sides of the triangle, the wave then being reflected from the base surface and then the two lateral surfaces again in the same order so as to finally appear at an output point on said base surface whereby said emerging wave is parallel to the entering wave and substantially normal to said base.

5. A device as claimed in claim 4 wherein the wave input and output points are located on opposite sides of the center of said base of the triangle.

6. A wave transmission delay device comprising a triangular prism body of wave transmitting material in which the wave reflecting surfaces of the body form said triangular prism in which the angles at the base are limited to the range of values between 46° and 50°, means for directing an input wave so that it enters the body at a point on the surface which, in a cross-section of the prism forms the base of the triangle, and at an angle such that the wave is reflected in sequence from the two lateral surfaces which, in a cross-section of the prism, form the other sides of the triangle, the wave then being reflected from the base surface and then the two lateral surfaces again in the same order so as to finally appear at an output point on said base surface, the wave input and output points being located on opposite sides of the center of said base of the triangle.

7. A wave transmission delay device comprising a triangular prism body composed of ultrasonic wave transmitting material in which the wave reflecting surfaces of the body form said triangular prism in which the angles at the base are limited to a range of values between 45° and 60°, means for directing an input wave so that it enters the body at a point on the surface which, in a cross-section of the prism forms the base of the triangle, and at an angle such that the wave is reflected in sequence from the two lateral surfaces which, in a cross-section of the prism, form the other sides of the triangle, the wave then being reflected from the base surface and then the two lateral surfaces again in the same order so as to finally appear at an output point on said base surface, said directing means including an electromechanical transducer located at said wave entering point on the base surface of the body, and an electromechanical transducer located at said output point on the base surface.

8. A device as claimed in claim 7 wherein said angles at the base are limited to the range of values between 46° and 50°.

9. A device as claimed in claim 7 further comprising ultrasonic wave damping means located at points on the prism reflecting surfaces that are out of the desired wave propagation path determined by the input and output points, the value of the base angles and the angle of entry of an input wave.

10. A device as claimed in claim 7 wherein the transducers are located on opposite sides of the center of said base of the triangle and the input wave enters perpendicular to the base surface.

* * * * *